US012651277B1

(12) United States Patent
Danilchenko et al.

(10) Patent No.: US 12,651,277 B1
(45) Date of Patent: Jun. 9, 2026

(54) NON-FUNGIBLE TOKEN SYSTEM GENERATING TETHERED AND REFERENCE NON-FUNGIBLE TOKENS AND RELATED METHODS

(71) Applicant: Inmar Clearing, Inc., Winston-Salem, NC (US)

(72) Inventors: Victor Danilchenko, South Hadley, MA (US); Kevin R. Goode, Clemmons, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 223 days.

(21) Appl. No.: 18/206,994

(22) Filed: Jun. 7, 2023

(51) Int. Cl.
*G06Q 30/0207* (2023.01)
*G06Q 20/36* (2012.01)
*G06Q 20/38* (2012.01)
*G06Q 20/40* (2012.01)

(52) U.S. Cl.
CPC ......... *G06Q 30/0222* (2013.01); *G06Q 20/36* (2013.01); *G06Q 20/382* (2013.01); *G06Q 20/401* (2013.01)

(58) Field of Classification Search
CPC .. G06Q 30/0222; G06Q 20/36; G06Q 20/382; G06Q 20/401
See application file for complete search history.

(56) References Cited

U.S. PATENT DOCUMENTS

| | | | | |
|---|---|---|---|---|
| 10,032,182 | B1* | 7/2018 | Lee | G06Q 30/0207 |
| 2021/0256070 | A1* | 8/2021 | Tran | G06Q 20/308 |
| 2022/0318852 | A1 | 10/2022 | Blaikie, III et al. | |
| 2024/0005305 | A1* | 1/2024 | Rush | G06Q 30/0242 |
| 2024/0033639 | A1* | 2/2024 | Meyers | A63F 13/69 |

OTHER PUBLICATIONS

NFT and online purchase intention: the moderating role of brand and situational involvement, Lili Zheng, p. 1 (Year: 2022).*

* cited by examiner

*Primary Examiner* — Ilana L Spar
*Assistant Examiner* — Darnell A Pouncil
(74) *Attorney, Agent, or Firm* — ALLEN, DYER, DOPPELT, + GILCHRIST, P.A.

(57) ABSTRACT

A non-fungible token (NFT) system may include a server cooperating to communicate a notification of a digital promotion having an acceptance rule set associated therewith. The server may prompt for acceptance of the promotion by accepting the acceptance rule set, and upon acceptance, generate a tethered NFT (tNFT) representative of the promotion and store the tNFT in a custodial wallet on a blockchain network, and generate a reference NFT (rNFT) referencing the tNFT and store the rNFT in the first shopper digital wallet on the blockchain network. The server may transfer the promotion to a second shopper digital wallet of a second shopper by transferring the rNFT to the second shopper digital wallet. The server may determine whether the second shopper has accepted the acceptance rule set, and if so, permit redemption of the promotion, and if not, request acceptance of the acceptance rule set.

21 Claims, 9 Drawing Sheets

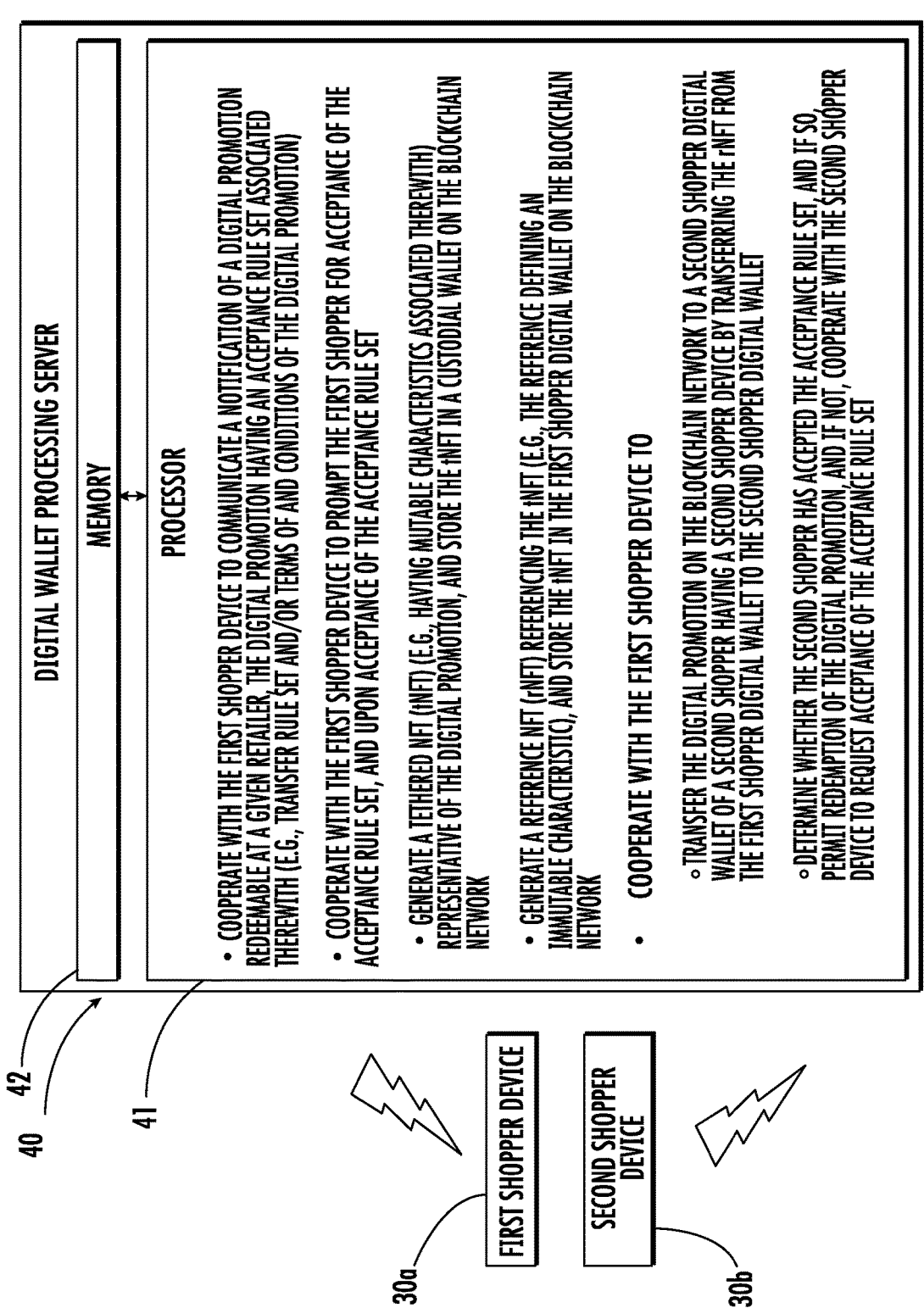

DIGITAL WALLET PROCESSING SERVER

MEMORY

PROCESSOR

- COOPERATE WITH THE FIRST SHOPPER DEVICE TO COMMUNICATE A NOTIFICATION OF A DIGITAL PROMOTION REDEEMABLE AT A GIVEN RETAILER, THE DIGITAL PROMOTION HAVING AN ACCEPTANCE RULE SET ASSOCIATED THEREWITH (E.G., TRANSFER RULE SET AND/OR TERMS OF AND CONDITIONS OF THE DIGITAL PROMOTION)

- COOPERATE WITH THE FIRST SHOPPER DEVICE TO PROMPT THE FIRST SHOPPER FOR ACCEPTANCE OF THE ACCEPTANCE RULE SET, AND UPON ACCEPTANCE OF THE ACCEPTANCE RULE SET

- GENERATE A TETHERED NFT (tNFT) (E.G., HAVING MUTABLE CHARACTERISTICS ASSOCIATED THEREWITH) REPRESENTATIVE OF THE DIGITAL PROMOTION, AND STORE THE tNFT IN A CUSTODIAL WALLET ON THE BLOCKCHAIN NETWORK

- GENERATE A REFERENCE NFT (rNFT) REFERENCING THE tNFT (E.G., THE REFERENCE DEFINING AN IMMUTABLE CHARACTERISTIC), AND STORE THE tNFT IN THE FIRST SHOPPER DIGITAL WALLET ON THE BLOCKCHAIN NETWORK

- COOPERATE WITH THE FIRST SHOPPER DEVICE TO

○ TRANSFER THE DIGITAL PROMOTION ON THE BLOCKCHAIN NETWORK TO A SECOND SHOPPER DIGITAL WALLET OF A SECOND SHOPPER HAVING A SECOND SHOPPER DEVICE BY TRANSFERRING THE rNFT FROM THE FIRST SHOPPER DIGITAL WALLET TO THE SECOND SHOPPER DIGITAL WALLET

○ DETERMINE WHETHER THE SECOND SHOPPER HAS ACCEPTED THE ACCEPTANCE RULE SET, AND IF SO, PERMIT REDEMPTION OF THE DIGITAL PROMOTION, AND IF NOT, COOPERATE WITH THE SECOND SHOPPER DEVICE TO REQUEST ACCEPTANCE OF THE ACCEPTANCE RULE SET

40

42

41

FIRST SHOPPER DEVICE

SECOND SHOPPER DEVICE

NON-FUNGIBLE TOKEN SYSTEM GENERATING TETHERED AND REFERENCE NON-FUNGIBLE TOKENS AND RELATED METHODS

The present invention relates to the field of non-fungible tokens (NFTs), and, more particularly, to NFT based digital wallet processing and related methods.

BACKGROUND

A non-fungible token (NFT) is a unique digital identifier that generally cannot be copied, substituted, or subdivided, that is recorded in a blockchain network, and that may serve as basis for verifying ownership. The ownership of an NFT is typically recorded in a blockchain network and can be transferred by the owner, allowing NFTs to be sold and traded. Some NFTs may have rules associated with it, for example, rules that accompany the item for which the NFT represents.

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period. Other promotional terms may include companion product and purchase quantity requirements.

SUMMARY

A non-fungible token (NFT) system may include a first shopper device associated with a first shopper. The first shopper may have a first shopper digital wallet on a block-chain network. The NFT system may also include a digital wallet processing server configured to cooperate with the first shopper device to communicate a notification of a digital promotion redeemable at a given retailer. The digital promotion may have an acceptance rule set associated therewith. The digital promotion processing server may be configured to cooperate with the first shopper device to prompt the first shopper for acceptance of the digital promotion by accepting the acceptance rule set. The digital promotion processing server is configured to, upon acceptance of the acceptance rule set, generate a tethered NFT (tNFT) representative of the digital promotion, and store the tNFT in a custodial wallet on the blockchain network, and generate a reference NFT (rNFT) referencing the tNFT, and store the rNFT in the first shopper digital wallet on the blockchain network. The digital promotion processing server may also be configured to cooperate with the first shopper device to transfer the digital promotion, on the blockchain network, to a second shopper digital wallet of a second shopper having a second shopper device by transferring the rNFT from the first shopper digital wallet to the second shopper digital wallet, and determine whether the second shopper has accepted the acceptance rule set, and if so, permit redemption of the digital promotion, and if not, cooperate with the second shopper device to request acceptance of the acceptance rule set from the second shopper.

The digital promotion may have a redemption rule set associated therewith. The digital wallet processing server may be configured to permit redemption of the digital promotion by the first shopper according to the redemption rule set. The redemption rule set may include a registration of the first shopper digital wallet with the digital wallet processing server, for example.

The digital promotion may have a redemption rule set associated therewith. The digital wallet processing server may be configured to permit redemption of the digital promotion by the second shopper according to the redemption rule set upon acceptance of the acceptance rule set by the second shopper. The redemption rule set may include a registration of the second shopper digital wallet with the digital wallet processing server, for example.

The tNFT may have a redemption value attribute associated therewith corresponding to the redemption value of the digital promotion. The digital wallet processing server may be configured to apply the redemption value to a purchase and update the redemption value attribute based thereon, for example.

The acceptance rule set may include at least one of a transfer rule set and terms and conditions of the digital promotion, for example. The first shopper digital wallet may have a first shopper digital wallet identifier associated therewith. The digital wallet processing server may be configured to generate and communicate a further digital promotion based upon the first shopper wallet identifier, for example.

The second shopper digital wallet may have a second shopper digital wallet identifier associated therewith. The digital wallet processing server may be configured to generate and communicate a further digital promotion based upon the second shopper wallet identifier, for example.

The tNFT may have mutable characteristics associated therewith, and the digital wallet processing server may be configured to update the mutable characteristics based upon redemption of the digital promotion. The reference of the rNFT to the tNFT may define an immutable characteristic of the tNFT, for example.

A method aspect is directed to a method of processing a non-fungible token (NFT). The method may include using a digital wallet processing server to cooperate with a first shopper device associated with a first shopper to communicate a notification of a digital promotion redeemable at a given retailer, wherein the digital promotion may have an acceptance rule set associated therewith. The method may also include using the digital wallet processing server to cooperate with the first shopper device to prompt the first shopper for acceptance of the digital promotion by accepting the acceptance rule set. The method may also include using the digital wallet processing server to, upon acceptance of the acceptance rule set, generate a tethered NFT (tNFT) representative of the digital promotion and store the tNFT in a custodial wallet on a blockchain network, and generate a reference NFT (rNFT) referencing the tNFT and store the rNFT in a first shopper digital wallet of the first shopper on the blockchain network. The method may further include using the digital wallet processing server to cooperate with the first shopper device to transfer the digital promotion, on the blockchain network, to a second shopper digital wallet of a second shopper having a second shopper device by transferring the rNFT from the first shopper digital wallet to the second shopper digital wallet, and determine whether the second shopper has accepted the acceptance rule set, and if so, permit redemption of the digital promotion, and if not, cooperate with the second shopper device to request acceptance of the acceptance rule set from the second shopper.

A computer readable medium aspect is directed to a non-transitory computer readable medium for processing a non-fungible token (NFT). The computer readable medium includes computer executable instructions that when executed by a processor cause the processor to perform operations. The operations may include cooperating with a first shopper device associated with a first shopper to communicate a notification of a digital promotion redeemable at a given retailer, wherein the digital promotion may have an acceptance rule set associated therewith. The operations may also include cooperating with the first shopper device to prompt the first shopper for acceptance of the digital promotion by accepting the acceptance rule set. The operations may further include, upon acceptance of the acceptance rule set, generating a tethered NFT (tNFT) representative of the digital promotion and storing the tNFT in a custodial wallet on a blockchain network, and generating a reference NFT (rNFT) referencing the tNFT and storing the rNFT in a first shopper digital wallet of the first shopper on the blockchain network. The operations may also include cooperating with the first shopper device to transfer the digital promotion, on the blockchain network, to a second shopper digital wallet of a second shopper having a second shopper device by transferring the rNFT from the first shopper digital wallet to the second shopper digital wallet, and determine whether the second shopper has accepted the acceptance rule set, and if so, permit redemption of the digital promotion, and if not, cooperate with the second shopper device to request acceptance of the acceptance rule set from the second shopper.

BRIEF DESCRIPTION OF THE DRAWINGS

FIG. 5 is a schematic block diagram of a portion of the digital wallet processing server of FIG. 1.

DETAILED DESCRIPTION

Figure 1:
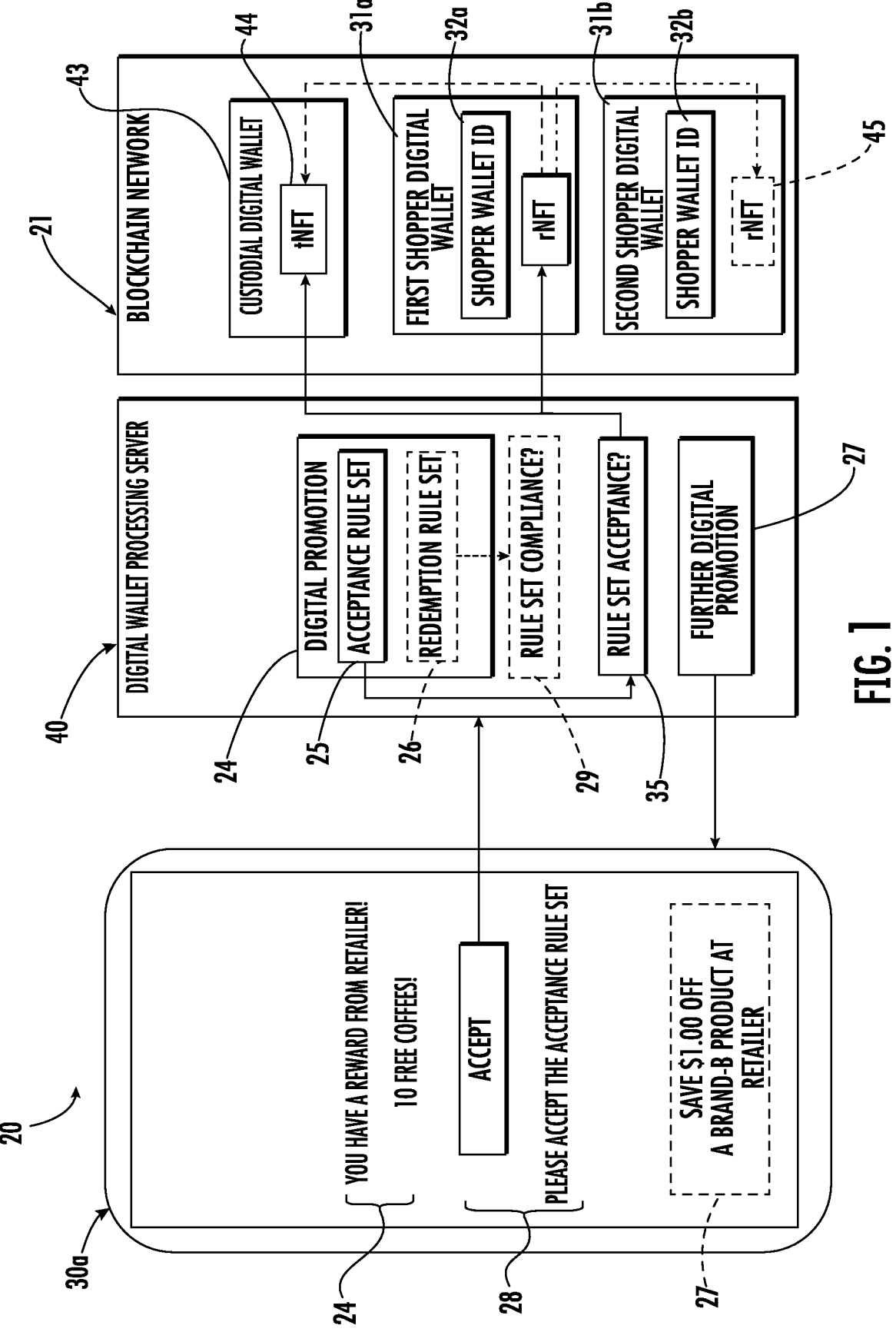
FIG. 1 is a schematic diagram of an NFT system in accordance of an embodiment.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-6, a non-fungible token (NFT) system 20 includes a first shopper device 30a associated with a first shopper. The first shopper device 30a is illustratively in the form of a mobile wireless communications device, and more particularly, a mobile or smart phone. The first shopper device 30a may be in the form of another type of device, for example, a personal computer, a tablet computer, a laptop computer, or a wearable computer. The first shopper has a first shopper digital wallet 31a on a blockchain network 21. The blockchain network 21 may be a public blockchain network, for example, as will be appreciated by those skilled in the art. The first shopper digital wallet 31a may be for storing NFTs related to or representative of digital promotions, for example, digital coupons, offers, loyalty program information, etc., as will be described in further detail below. The first shopper digital wallet 31a may have a first shopper digital wallet identifier 32a associated therewith.

The NFT system 20 also includes a digital wallet processing server 40. The digital wallet processing server 40 includes a processor 41 and an associated memory 42 (FIG. 5). While operations of the digital wallet processing server 40 are described herein, it should be understood that the processor 41 and the memory 42 cooperate to perform the operations.

Figure 7A:
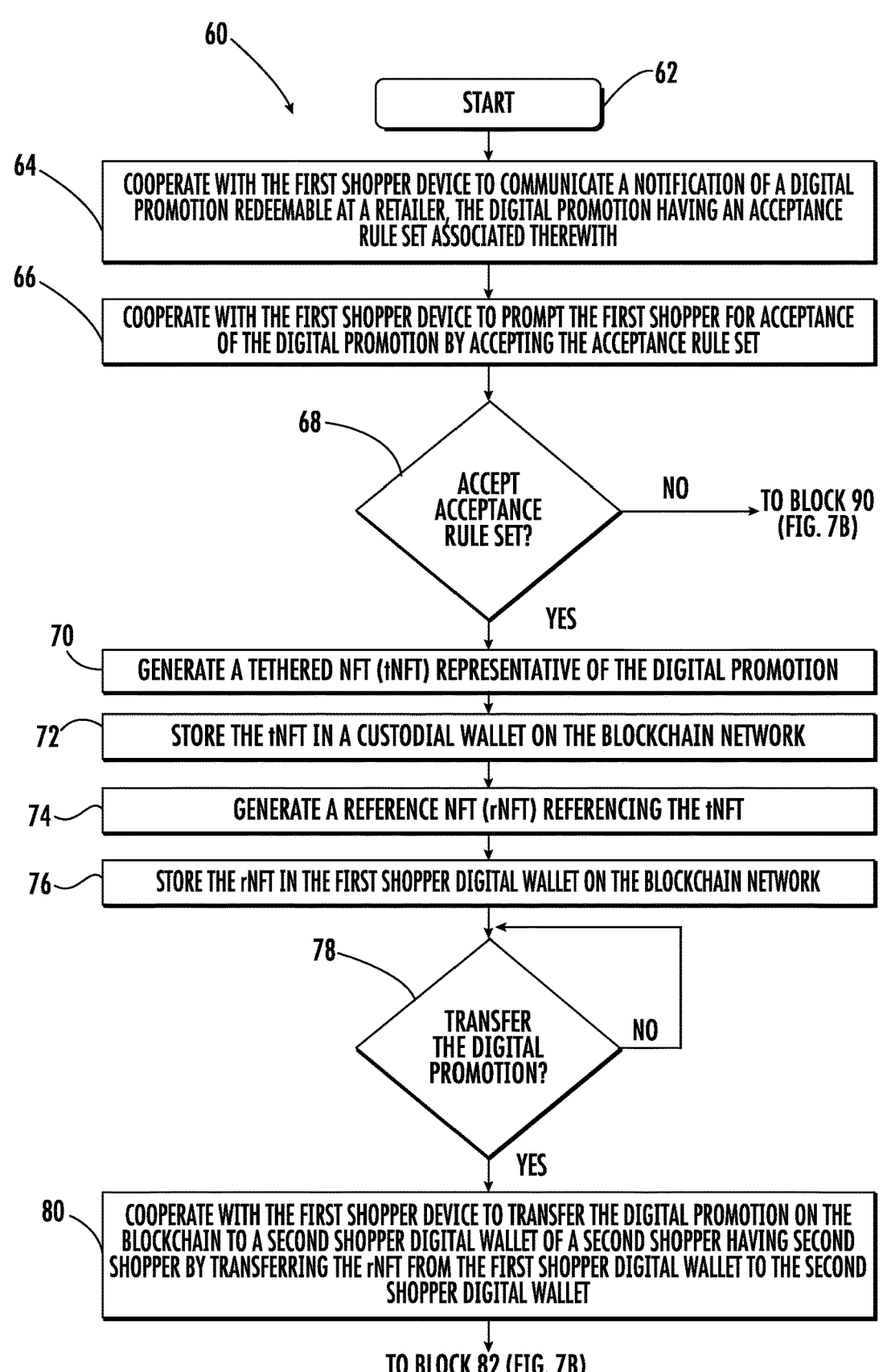
FIGS. 7A and 7B are flow diagrams illustrating operation of the digital wallet processing server of FIG. 1.
Figure 7B:
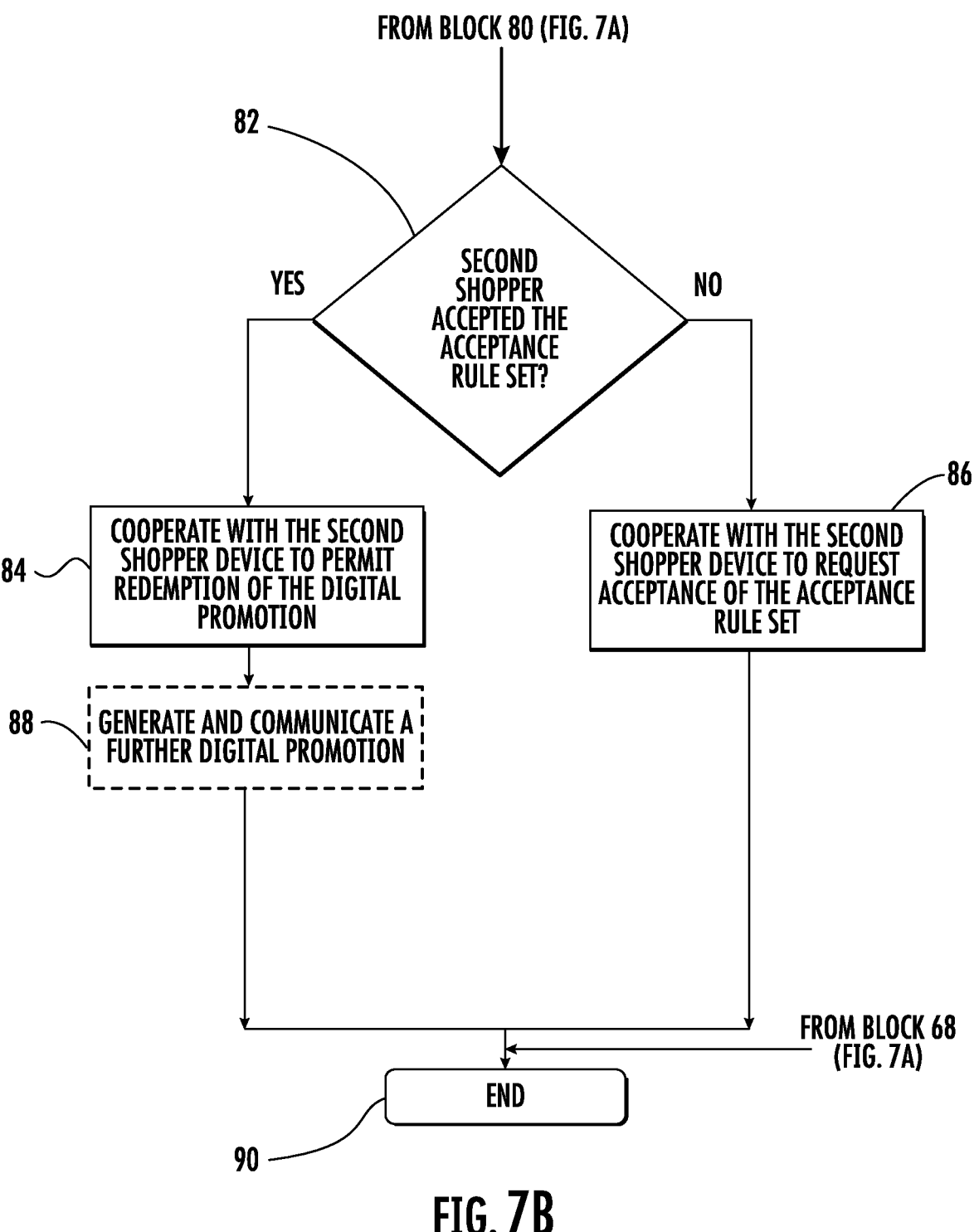

Referring now additionally to the flowchart 60 in FIGS. 7A and 7B, beginning at Block 62, operations of the digital wallet processing server 40 will now be described. At Block 64, the digital wallet processing server 40 cooperates with the first shopper device 30a to communicate a notification 23 of a digital promotion 24 redeemable at a given retailer. The given digital promotion 24 may be in the form of a digital coupon, for example, for a given dollar amount off a purchase (e.g., or a given product) at the given retailer. The digital promotion 24 may be targeted to the given shopper, for example, based upon basket level data (i.e., products being purchased during a purchase transaction). An exemplary digital promotion 24 may be for "free coffee on Mondays" at the given retailer, or for "10-free coffees" (FIGS. 1-4). Another exemplary digital promotion 24 may be a monetary or dollar value off the purchase of a given product for purchase at the given retailer.

The digital promotion 24 has an acceptance rule set 25 associated therewith. The acceptance rule set 25 may include terms and conditions for the digital promotion and/or a transfer rule set, for example. The acceptance rule set 25 may thus be considered a legal license agreement between the first shopper and the issuer of the digital promotion 24. As will be appreciated by those skilled in the art, an acceptance rule set 25 is typically accepted by the end user, in this case, the first shopper, to accept the digital promotion 24.

The digital wallet processing server 40, at Block 66, cooperates with the first shopper device 30a to prompt the first shopper for acceptance of the digital promotion 24 by accepting the acceptance rule set 25. The prompt 28 may request input from the first shopper in the form of input to the first shopper device 30a corresponding to the acceptance (or denial) of the acceptance rule set 25. For example, the first shopper may provide touch input to a touch screen of the first shopper device 30a to indicate acceptance (or denial) of the acceptance rule set 25.

If, at Block 68, the first shopper does not accept (or denies) the acceptance rule set 25, operations end at Block

90. In other words, the digital promotion 24 is not redeemable by the first shopper, for example, as if the first shopper did not receive the digital promotion.

If, at Block 68, the first shopper accepts the acceptance rule set 25 (rule set acceptance 35), the digital wallet processing server 40 generates a tethered NFT (tNFT) 44 (Block 70). The tNFT 44 is representative of the digital promotion 24. In other words, the tNFT 44 is the digital promotion embodied as an NFT. The digital wallet processing server 40 stores the tNFT 44 in a custodial wallet 43 on the blockchain network 21 (Block 72). The custodial wallet 43 may be associated with the given retailer, for example and store the tNFT 44 for the benefit of the first shopper or subsequent shoppers as will be described in further detail below.

Figure 2:
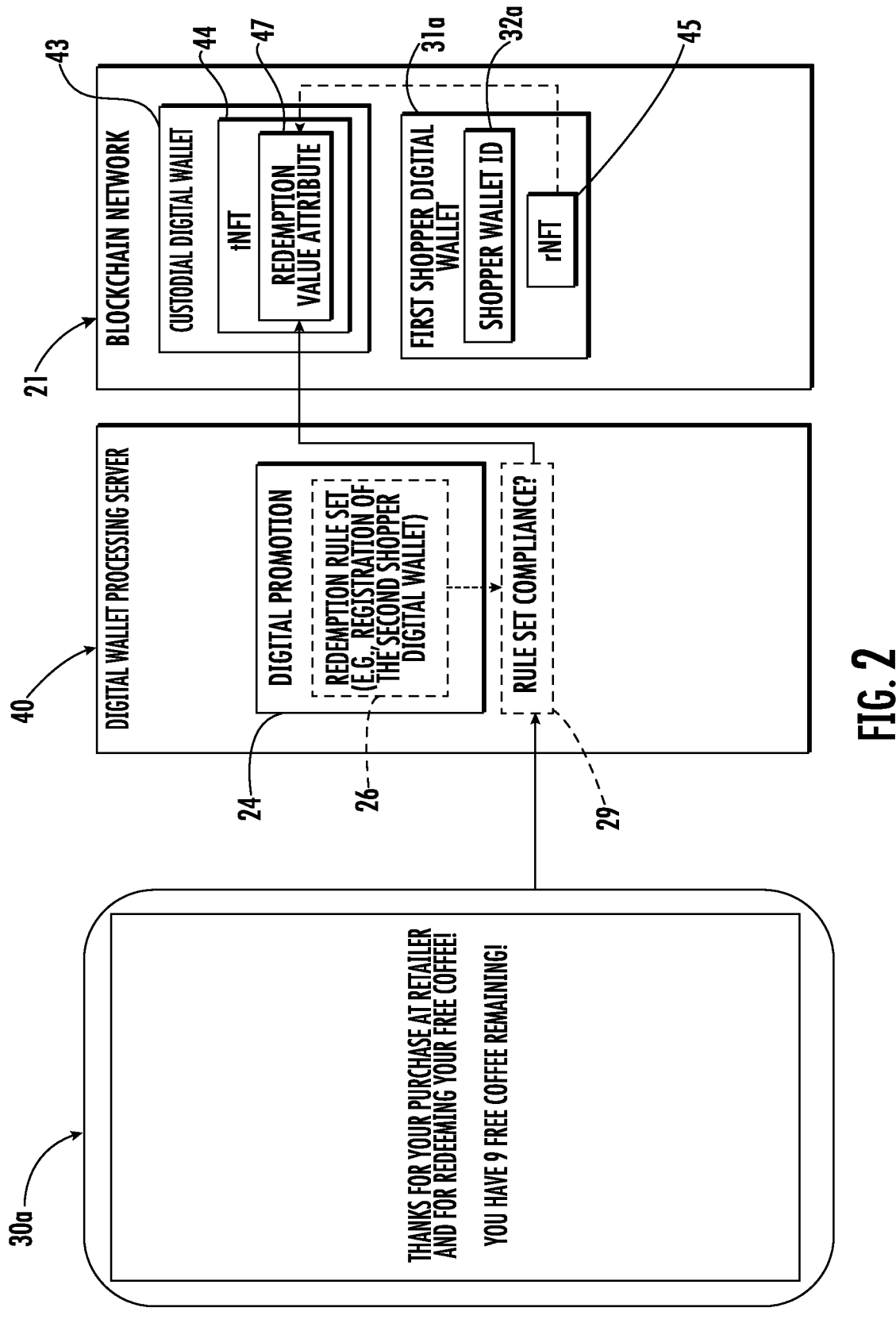
FIG. 2 is a schematic diagram of the NFT system of FIG. 1 illustrating redemption of the digital promotion by the first shopper.

At Block 74, the digital wallet processing server 40 generates a reference NFT (rNFT) 45 referencing the tNFT 44. The reference of the rNFT 45 to the tNFT 44 may be considered an immutable characteristic of the tNFT. The digital wallet processing server 40 stores the rNFT 45 in the first shopper digital wallet 31*a* on the blockchain network 21 (Block 76). The digital promotion 24 may be redeemed by the first shopper upon or after acceptance of the acceptance rule set 25 (FIG. 2).

Figure 3:
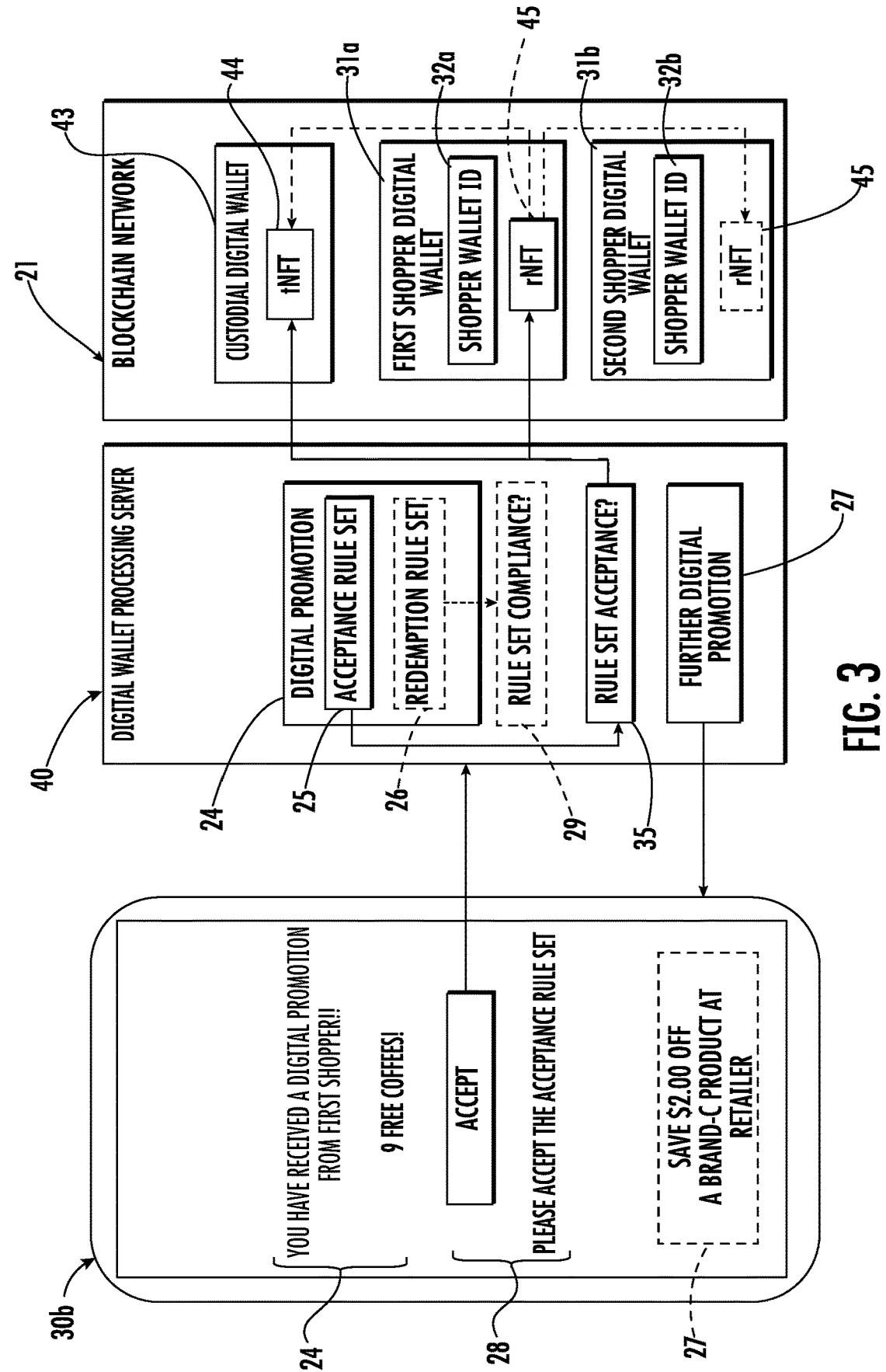
FIG. 3 is a schematic diagram of the NFT system of FIG. 1 illustrating transfer of the digital promotion to the second shopper.

At Block 80, the digital wallet processing server 40, for example, when the first shopper is desirous of transferring (e.g., gifting, after a partial redemption (FIG. 2)) the digital promotion 24 (Block 78), cooperates with the first shopper device 30*a* to transfer the digital promotion to a second shopper digital wallet 31*b* on the blockchain network 21. The second shopper digital wallet 31*b* is associated with a second shopper. The digital wallet processing server 40 transfers the digital promotion 24 to the second shopper digital wallet 31*b* by transferring the rNFT 45 from the first shopper digital wallet 31*a* to the second shopper digital wallet 31*b* (FIG. 3).

The second shopper digital wallet 31*b*, similar to the first shopper digital wallet 31*a* may be for storing NFTs related to or representative of digital promotions, for example, digital coupons, offers, loyalty program information, etc., as will be described in further detail below. The second shopper digital wallet 31*b* may also have a second shopper digital wallet identifier 32*b* associated therewith.

Figure 4:
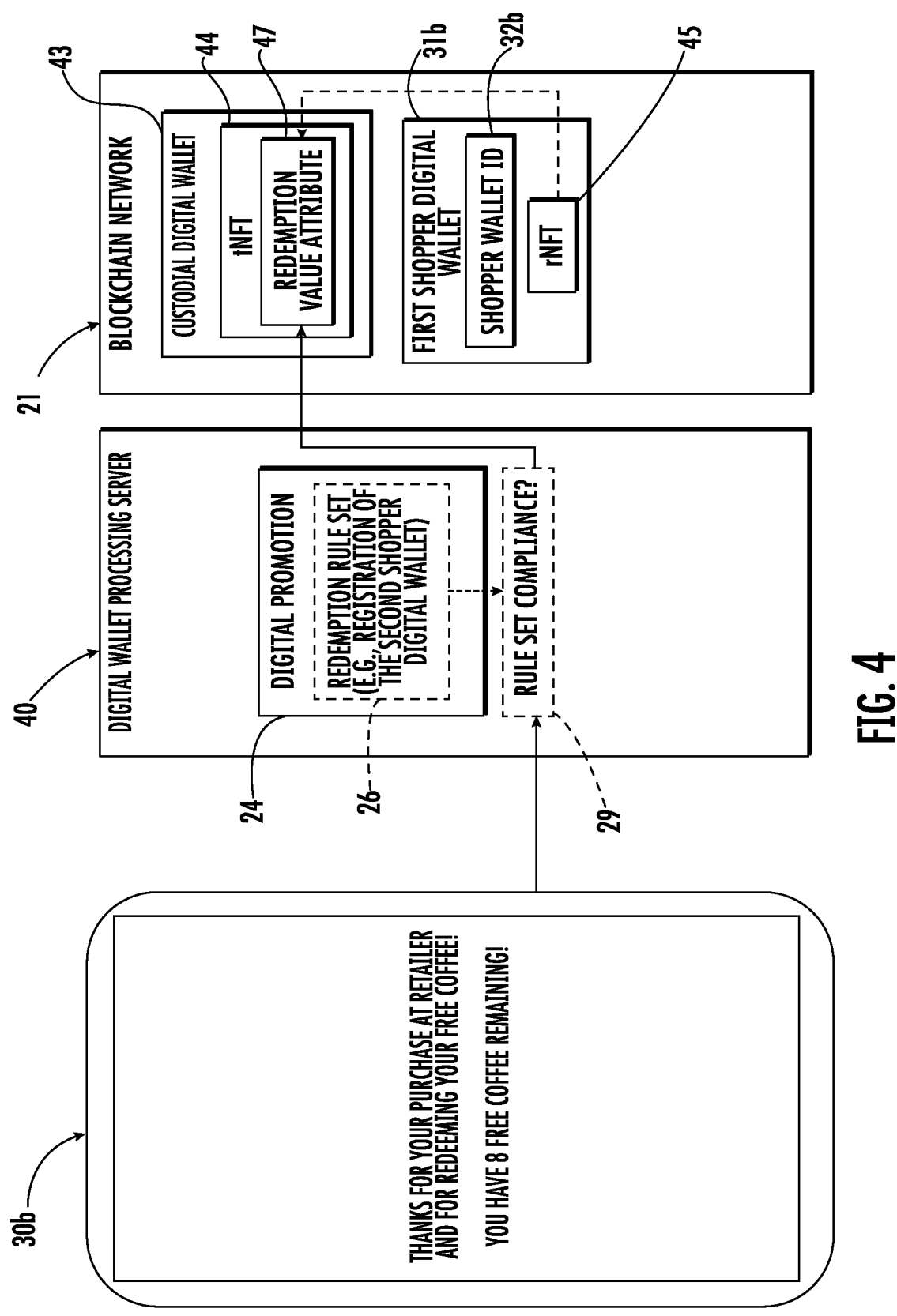
FIG. 4 is a schematic diagram of the NFT system of FIG. 1 illustrating redemption of the digital promotion by the second shopper.

The digital wallet processing server 40 determines whether the second shopper has accepted the acceptance rule set 25 (Block 82). If at Block 82 the digital wallet processing server 40 determines that the second shopper has accepted the acceptance rule set 35, the digital wallet processing server 40 permits redemption of the digital promotion 24 (Block 84) (FIG. 4).

If at Block 82 the digital wallet processing server 40 determines that the second shopper has not accepted the acceptance rule set 25, the digital wallet processing server cooperates with the second shopper device 30*b* to request acceptance of the acceptance rule set 25 (Block 86). The digital wallet processing server 40 may cooperate with the second shopper device 30*b* similarly to the first shopper device 30*a*, for example, to prompt the second shopper (e.g., by way of a prompt 28 for input via the touch display) to accept the acceptance rule set 25 (FIG. 3). As will be appreciated by those skilled in the art, redemption of the digital promotion 24, for example, according to a redemption rule set, may be disabled or not be able to proceed until the acceptance rule set has been accepted by the second shopper. The digital wallet processing server 40 may poll at the prompt 28 for acceptance of the acceptance rule set 25. In some embodiments, if the second shopper denies or does not accept the acceptance rule set 25, e.g., after a threshold time period, operations end at Block 90.

At Block 88, the digital wallet processing server 40 may optionally generate and communicate a further digital promotion 27. The digital wallet processing server 40 may communicate the further digital promotion 27 for another product, for example, different product than the product associated with the digital promotion 24. The further digital promotion 27 may be considered a targeted digital promotion, for example, and may be generated and communicated based upon the first and/or second (e.g., and/or further) shopper wallet identifiers 32*a*, 32*b* (FIGS. 1 and 3, respectively). In other words, the digital wallet processing server 40 may identify the first and/or second shoppers and, for example, based upon known information about that shopper (e.g., product purchase history, purchasing habits, loyalty program information), generate and communicate the further digital promotion 27. Operations end at Block 90.

Figure 6:
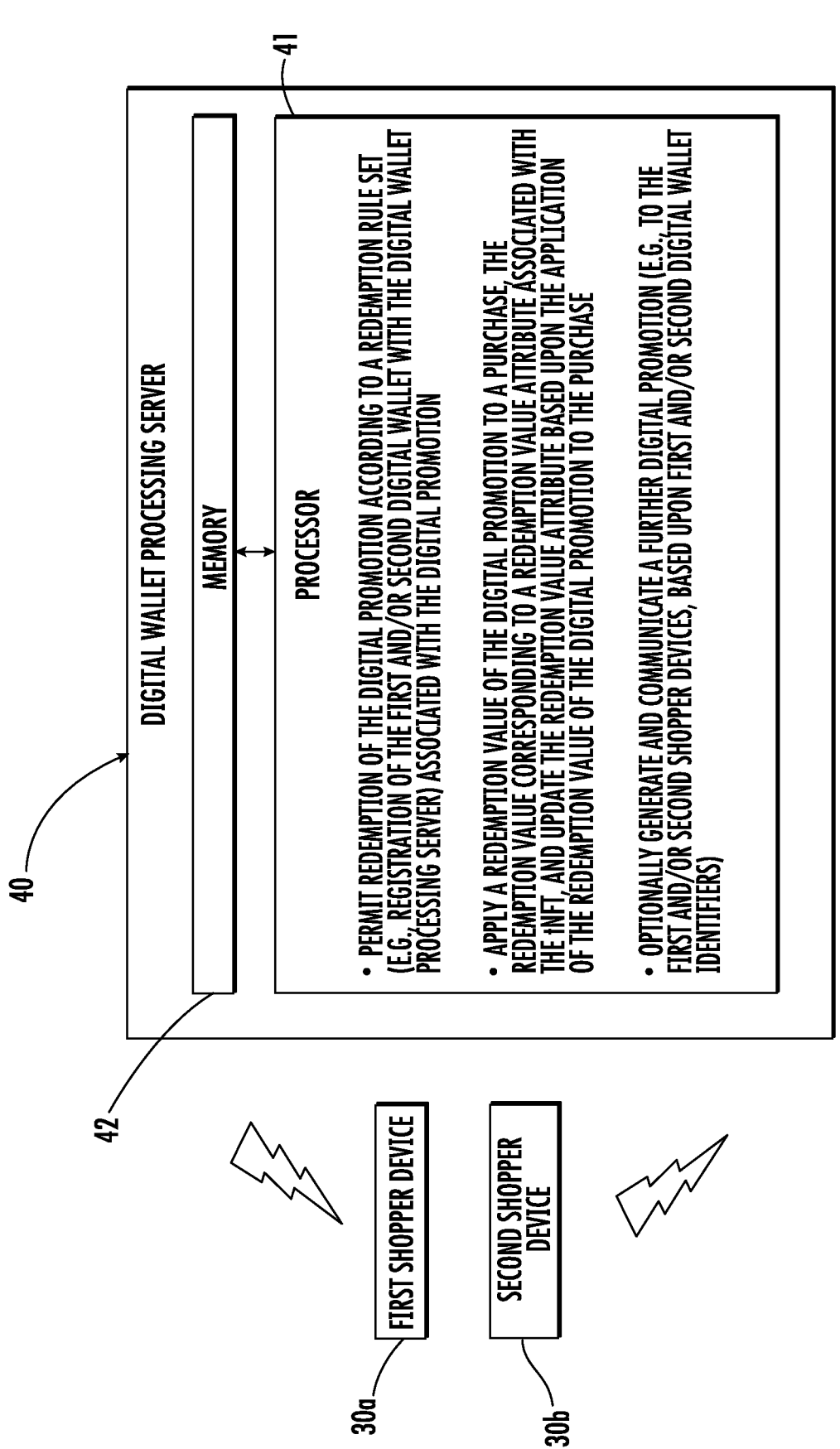
FIG. 6 is a schematic block diagram of another portion of the digital wallet processing server of FIG. 1.
Figure 8:
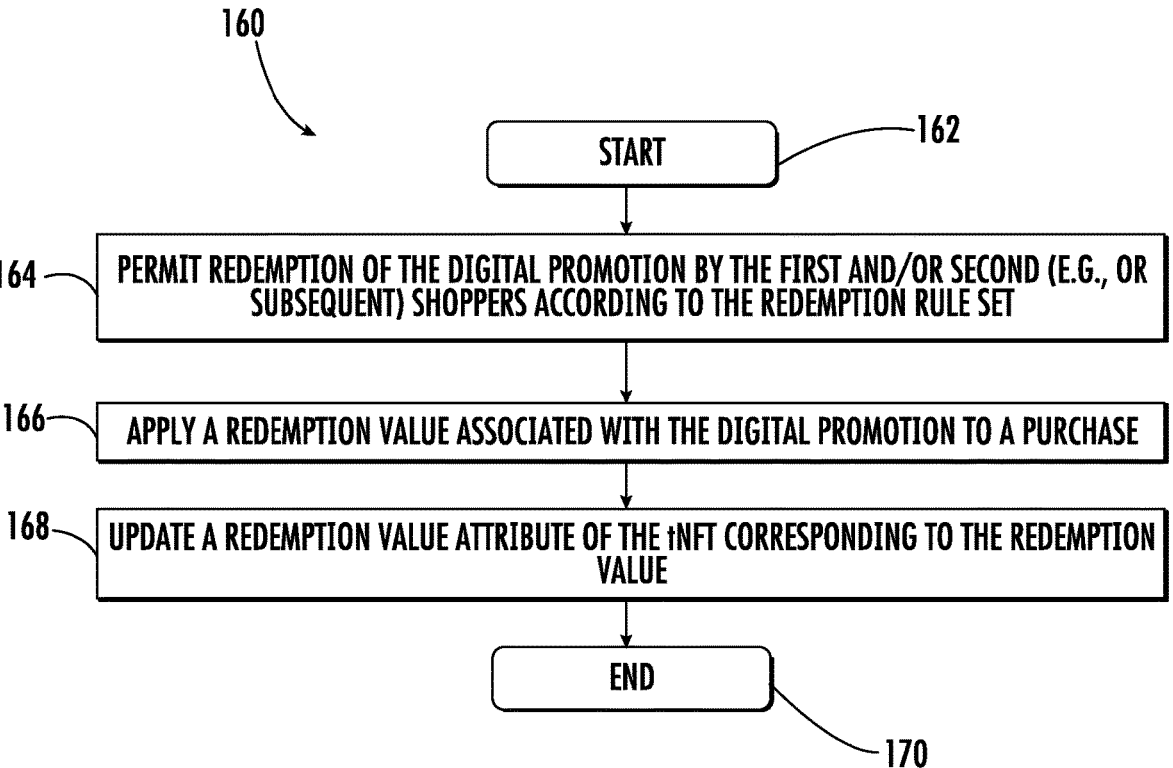
FIG. 8 is a flow diagram illustrating redemption operations of the digital wallet processing server.

Referring now additionally to the flowchart 160 in FIG. 8, beginning at Block 162, operations of the digital wallet processing server 40 with respect to redemption of the digital promotion 24 will now be described, for example, once the acceptance rule set 25 has been accepted. The digital promotion 24 has a redemption rule set 26 associated therewith (FIGS. 1 and 3). The redemption rule set 26, which may be a different rule set than the acceptance rule set 25, may include one or more rules or prerequisites that are to be satisfied (e.g., outside of accepting the acceptance rule set) before the digital promotion 24 or rNFT 45/tNFT 44 can be redeemed. For example, the redemption rule set 26 may include registration of the first shopper digital wallet 31*a* with the digital wallet processing server 40. More particularly, registration of the first shopper digital wallet 31*a* may include providing a shopper digital wallet address associated with the first shopper digital wallet 31*a* on the blockchain network 21 (FIGS. 2 and 6). In some embodiments, registration of the first shopper digital wallet 31*a* may include enrollment of the first shopper digital wallet in a loyalty program, for example, associated with the given retailer. As will be appreciated by those skilled in the art, the redemption may be permitted upon or when the acceptance rule set has been accepted (redemption rule set compliance 29) (FIG. 2). If, for example, the first, second, or subsequent shopper(s), do not accept the acceptance rule set 25, redemption may not be permitted, for example, determination of whether the redemption rule set 26 has been complied (redemption rule set compliance 29) may not occur.

Similarly, the redemption rule set 26 may also be applicable to the second shopper (FIG. 4), for example, upon desired redemption after the digital promotion 24 has been transferred to the second shopper digital wallet 31*b* as described above. For example, the redemption rule set 26 may include registration of the second shopper digital wallet 31*b* with the digital wallet processing server 40. More particularly, registration of the second shopper digital wallet 31*b* may include providing a shopper digital wallet address associated with the second shopper digital wallet 31*b* on the blockchain network 21. In some embodiments, registration of the second shopper digital wallet 31*b* may include enrollment of the second shopper digital wallet in a loyalty program, for example, associated with the given retailer.

The digital wallet processing server 40 permits redemption of the digital promotion 24 by the first or second (or subsequent) shoppers (FIGS. 2 and 4) according to the redemption rule set 26 (Block 164). Upon redemption, for example, after redemption is permitted, the digital wallet processing server 40 applies a redemption value associated with the digital promotion (e.g., $1.00 Off) to a purchase (Block 166) and updates a redemption value attribute 47 of the tNFT 44 corresponding to the redemption value (FIGS. 2 and 4). (Block 168). For example, if the digital promotion 24 is for 10-free coffees, the redemption value attribute 47 of the tNFT may permit 10-redemptions at the value of the coffee. Upon a redemption, the redemption value attribute 47 is updated (e.g., in the exemplar, decreased by one free coffee). More particularly, the tNFT 44 has one or more mutable characteristics associated therewith that are updated based upon redemption, such as, for example, the redemption attribute. The mutable characteristics may be advantageous for tracking license acceptance, such as, for example, as it relates to partial or whole redemptions. Operations end at Block 170.

As will be appreciated by those skilled in the art, the NFT system 20 may be particularly advantageous for addressing links between technology (e.g., rights associated with NFTs) relating to digital promotions, and legal aspects of the digital promotions, for example, legal license agreements that typically accompany the NFT and/or digital promotion. More particularly, more complex digital promotions that may permit multiple or partial redemptions may be managed across shoppers and within the confines of the rule sets established therefore. Those skilled in the art will appreciate that there may be technological challenges to tracking rule set compliance across different shoppers or users.

A method aspect is directed to a method of processing a non-fungible token (NFT). The method includes using a digital wallet processing server 40 to cooperate with a first shopper device 30a associated with a first shopper to communicate a notification 23 of a digital promotion 24 redeemable at a given retailer, wherein the digital promotion may have an acceptance rule set 25 associated therewith. The method also includes using the digital wallet processing server 40 to cooperate with the first shopper device 30a to prompt the first shopper for acceptance of the digital promotion 24 by accepting the acceptance rule set 35. The method also includes using the digital wallet processing server 40 to, upon acceptance of the acceptance rule set 35, generate a tethered NFT (tNFT) 44 representative of the digital promotion 24 and store the tNFT in a custodial wallet 43 on a blockchain network 21, and generate a reference NFT (rNFT) 45 referencing the tNFT and store the rNFT in a first shopper digital wallet 31a of the first shopper on the blockchain network. The method further includes using the digital wallet processing server 40 to cooperate with the first shopper device 30a to transfer the digital promotion 24, on the blockchain network 21, to a second shopper digital wallet 31b of a second shopper having a second shopper device 30b by transferring the rNFT 45 from the first shopper digital wallet 31a to the second shopper digital wallet, and determine whether the second shopper has accepted the acceptance rule set 25, and if so, permit redemption of the digital promotion, and if not, cooperate with the second shopper device to request acceptance of the acceptance rule set from the second shopper.

A computer readable medium aspect is directed to a non-transitory computer readable medium for processing a non-fungible token (NFT). The computer readable medium includes computer executable instructions that when executed by a processor 41 cause the processor to perform operations. The operations include cooperating with a first shopper device 30a associated with a first shopper to communicate a notification 23 of a digital promotion 24 redeemable at a given retailer, wherein the digital promotion may have an acceptance rule set 25 associated therewith. The operations also include cooperating with the first shopper device 30a to prompt the first shopper for acceptance of the digital promotion 24 by accepting the acceptance rule set 25. The operations may further include, upon acceptance of the acceptance rule set 25, generating a tethered NFT (tNFT) 44 representative of the digital promotion 24 and storing the tNFT in a custodial wallet 43 on a blockchain network 21, and generating a reference NFT (rNFT) 45 referencing the tNFT and storing the rNFT in a first shopper digital wallet 31a of the first shopper on the blockchain network. The operations also include cooperating with the first shopper device 30a to transfer the digital promotion 24, on the blockchain network 21, to a second shopper digital wallet 31b of a second shopper having a second shopper device 30b by transferring the rNFT 45 from the first shopper digital wallet 31a to the second shopper digital wallet, and determine whether the second shopper has accepted the acceptance rule set 25, and if so, permit redemption of the digital promotion, and if not, cooperate with the second shopper device to request acceptance of the acceptance rule set from the second shopper.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A non-fungible token (NFT) system comprising:
a first shopper device associated with a first shopper, the first shopper having a first shopper digital wallet on a blockchain network; and
a digital wallet processing server configured to
cooperate with the first shopper device to communicate a notification of a digital promotion redeemable at a given retailer, the digital promotion having an acceptance rule set associated therewith and a redemption rule set associated therewith permitting multiple redemptions thereof, and
cooperate with the first shopper device to prompt the first shopper for acceptance of the digital promotion by accepting the acceptance rule set, and upon acceptance of the acceptance rule set
generate a tethered NFT (tNFT) representative of the digital promotion, and store the tNFT in a custodial wallet on the blockchain network, the tNFT having a redemption value attribute associated therewith corresponding to a redemption value,
generate a reference NFT (rNFT) referencing the tNFT, and store the rNFT in the first shopper digital wallet on the blockchain network, and
permit at least one redemption of the digital promotion by the first shopper according to the redemption rule set, and upon each redemption, apply the redemption value to a purchase and update the redemption value attribute of the tNFT corresponding to the redemption value, and
cooperate with the first shopper device to, when at least one additional redemption of the digital promotion is permitted based upon the redemption value attribute transfer the digital promotion, on the blockchain network, to a second shopper digital wallet of a second shopper having a second shopper device by transferring the rNFT from the first shopper digital wallet to the second shopper digital wallet, and determine whether the second shopper has accepted the acceptance rule set, and if so, permit the at least one additional redemption of the digital promotion by the second shopper according to the redemption rule set, and upon each additional redemption, apply the redemption value to a purchase and update the redemption value attribute of the tNFT corresponding to the redemption value, and if not, cooperate with the second shopper device to request acceptance of the acceptance rule set from the second shopper.

2. The NFT system of claim 1 wherein the redemption rule set comprises a registration of the first shopper digital wallet with the digital wallet processing server.

3. The NFT system of claim 1 wherein the redemption rule set comprises a registration of the second shopper digital wallet with the digital wallet processing server.

4. The NFT system of claim 1 wherein the acceptance rule set comprises at least one of a transfer rule set and terms and conditions of the digital promotion.

5. The NFT system of claim 1 wherein the first shopper digital wallet has a first shopper digital wallet identifier associated therewith; and wherein the digital wallet processing server is configured to generate and communicate a further digital promotion based upon the first shopper wallet identifier.

6. The NFT system of claim 1 wherein the second shopper digital wallet has a second shopper digital wallet identifier associated therewith; and wherein the digital wallet processing server is configured to generate and communicate a further digital promotion based upon the second shopper wallet identifier.

7. The NFT system of claim 1 wherein the reference of the rNFT to the tNFT defines an immutable characteristic of the tNFT.

8. A digital wallet processing server comprising:

a processor and an associated memory configured to cooperate with a first shopper device associated with a first shopper to communicate a notification of a digital promotion redeemable at a given retailer, the digital promotion having an acceptance rule set associated therewith and a redemption rule set associated therewith permitting multiple redemptions thereof, cooperate with the first shopper device to prompt the first shopper for acceptance of the digital promotion by accepting the acceptance rule set, and upon acceptance of the acceptance rule set generate a tethered non-fungible token (tNFT) representative of the digital promotion, and store the tNFT in a custodial wallet on a blockchain network, the tNFT having a redemption value attribute associated therewith corresponding to a redemption value, generate a reference NFT (rNFT) referencing the tNFT, and store the rNFT in a first shopper digital wallet of the first shopper on the blockchain network, and permit at least one redemption of the digital promotion by the first shopper according to the redemption rule set, and upon each redemption, apply the redemption value to a purchase and update the redemption value attribute of the tNFT corresponding to the redemption value, and cooperate with the first shopper device to, when at least one additional redemption of the digital promotion is permitted based upon the redemption value attribute transfer the digital promotion, on the blockchain network, to a second shopper digital wallet of a second shopper having a second shopper device by transferring the rNFT from the first shopper digital wallet to the second shopper digital wallet, and determine whether the second shopper has accepted the acceptance rule set, and if so, permit the at least one additional redemption of the digital promotion by the second shopper according to the redemption rule set, and upon each additional redemption, apply the redemption value to a purchase and update the redemption value attribute of the tNFT corresponding to the redemption value, and if not, cooperate with the second shopper device to request acceptance of the acceptance rule set from the second shopper.

9. The digital wallet processing server of claim 8 wherein the first shopper digital wallet has a first shopper digital wallet identifier associated therewith; and wherein the processor is configured to generate and communicate a further digital promotion based upon the first shopper wallet identifier.

10. The digital wallet processing server of claim 8 wherein the second shopper digital wallet has a second shopper digital wallet identifier associated therewith; and wherein the processor is configured to generate and communicate a further digital promotion based upon the second shopper wallet identifier.

11. A method of processing a non-fungible token (NFT) comprising:

using a digital wallet processing server to cooperate with a first shopper device associated with a first shopper to communicate a notification of a digital promotion redeemable at a given retailer, the digital promotion having an acceptance rule set associated therewith and a redemption rule set associated therewith permitting multiple redemptions thereof, cooperate with the first shopper device to prompt the first shopper for acceptance of the digital promotion by accepting the acceptance rule set, and upon acceptance of the acceptance rule set generate a tethered NFT (tNFT) representative of the digital promotion, and store the tNFT in a custodial wallet on a blockchain network, the tNFT having a redemption value attribute associated therewith corresponding to a redemption value, generate a reference NFT (rNFT) referencing the tNFT, and store the rNFT in a first shopper digital wallet of the first shopper on the blockchain network, and permit at least one redemption of the digital promotion by the first shopper according to the redemption rule set, and upon each redemption, apply the redemption value to a purchase and update the redemption value attribute of the tNFT corresponding to the redemption value, and cooperate with the first shopper device to, when at least one additional redemption of the digital promotion is permitted based upon the redemption value attribute

US 12,651,277 B1

11 transfer the digital promotion, on the blockchain
network, to a second shopper digital wallet of a
second shopper having a second shopper device
by transferring the rNFT from the first shopper
digital wallet to the second shopper digital wallet,
and
determine whether the second shopper has accepted
the acceptance rule set, and if so, permit the at
least one additional redemption of the digital
promotion by the second shopper according to the
redemption rule set, and upon each additional
redemption, apply the redemption value to a pur-
chase and update the redemption value attribute of
the tNFT corresponding to the redemption value,
and if not, cooperate with the second shopper
device to request acceptance of the acceptance
rule set from the second shopper.

12. A non-transitory computer readable medium for pro-
cessing a non-fungible token (NFT) comprising computer
executable instructions that when executed by a processor
cause the processor to perform operations comprising:
cooperating with a first shopper device associated with a
first shopper to communicate a notification of a digital
promotion redeemable at a given retailer, the digital
promotion having an acceptance rule set associated
therewith and a redemption rule set associated there-
with permitting multiple redemptions thereof;
cooperating with the first shopper device to prompt the
first shopper for acceptance of the digital promotion by
accepting the acceptance rule set, and upon acceptance
of the acceptance rule set
generating a tethered NFT (tNFT) representative of the
digital promotion, and storing the tNFT in a custodial
wallet on a blockchain network, the tNFT having a
redemption value attribute associated therewith cor-
responding to a redemption value,
generating a reference NFT (rNFT) referencing the
tNFT, and storing the rNFT in a first shopper digital
wallet of the first shopper on the blockchain network,
and
permitting at least one redemption of the digital pro-
motion by the first shopper according to the redemp-
tion rule set, and upon each redemption, applying the
redemption value to a purchase and update the
redemption value attribute of the tNFT correspond-
ing to the redemption value; and
cooperating with the first shopper device to, when at least
one additional redemption of the digital promotion is
permitted based upon the redemption value attribute

12 transferring the digital promotion, on the blockchain
network, to a second shopper digital wallet of a
second shopper having a second shopper device by
transferring the rNFT from the first shopper digital
wallet to the second shopper digital wallet, and
determining whether the second shopper has
accepted the acceptance rule set, and if so, per-
mitting the at least one redemption of the digital
promotion by the second shopper according to the
redemption rule set, and upon each additional
redemption, applying the redemption value to a
purchase and updating the redemption value attri-
bute of the tNFT corresponding to the redemption
value, and if not, cooperating with the second
shopper device to request acceptance of the accep-
tance rule set from the second shopper.

13. The digital wallet processing server of claim 8
wherein the redemption rule set comprises a registration of
the first shopper digital wallet with the digital wallet pro-
cessing server.

14. The digital wallet processing server of claim 8
wherein the redemption rule set comprises a registration of
the second shopper digital wallet with the digital wallet
processing server.

15. The digital wallet processing server of claim 8
wherein the acceptance rule set comprises at least one of a
transfer rule set and terms and conditions of the digital
promotion.

16. The method of claim 11 wherein the redemption rule
set comprises a registration of the first shopper digital wallet
with the digital wallet processing server.

17. The method of claim 11 wherein the redemption rule
set comprises a registration of the second shopper digital
wallet with the digital wallet processing server.

18. The method of claim 11 wherein the acceptance rule
set comprises at least one of a transfer rule set and terms and
conditions of the digital promotion.

19. The non-transitory computer readable medium of
claim 12 wherein the redemption rule set comprises a
registration of the first shopper digital wallet with the digital
wallet processing server.

20. The non-transitory computer readable medium of
claim 12 wherein the redemption rule set comprises a
registration of the second shopper digital wallet with the
digital wallet processing server.

21. The non-transitory computer readable medium of
claim 12 wherein the acceptance rule set comprises at least
one of a transfer rule set and terms and conditions of the
digital promotion.

* * * * *